(12) United States Patent
Yano et al.

(10) Patent No.: US 10,584,069 B2
(45) Date of Patent: Mar. 10, 2020

(54) CBN SINTERED MATERIAL AND CUTTING TOOL

(71) Applicant: MITSUBISHI MATERIALS CORPORATION, Tokyo (JP)

(72) Inventors: Masahiro Yano, Naka-gun (JP); Yosuke Miyashita, Naka-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 187 days.

(21) Appl. No.: 15/906,759

(22) Filed: Feb. 27, 2018

(65) Prior Publication Data

US 2018/0257995 A1 Sep. 13, 2018

(30) Foreign Application Priority Data

Mar. 1, 2017 (JP) ................................. 2017-038471

(51) Int. Cl.
*B23B 27/14* (2006.01)
*C04B 35/5831* (2006.01)
(Continued)

(52) U.S. Cl.
CPC ........ *C04B 35/5831* (2013.01); *B23B 27/148* (2013.01); *C04B 35/6261* (2013.01); *C04B 35/6264* (2013.01); *C04B 35/64* (2013.01); *C04B 35/645* (2013.01); *B23B 2226/125* (2013.01); *C04B 2235/3217* (2013.01); *C04B 2235/3222* (2013.01); *C04B 2235/3234* (2013.01); *C04B 2235/386* (2013.01); *C04B 2235/3813* (2013.01); *C04B 2235/3847* (2013.01); *C04B 2235/3865* (2013.01); *C04B 2235/3886* (2013.01); *C04B 2235/5445* (2013.01); *C04B 2235/5454* (2013.01); *C04B 2235/604* (2013.01); *C04B 2235/661* (2013.01); *C04B 2235/781* (2013.01); *C04B 2235/785* (2013.01); *C04B 2235/786* (2013.01); *C04B 2235/80* (2013.01); *C04B 2235/85* (2013.01)

(58) Field of Classification Search
USPC .................. 51/307, 309; 428/325, 698, 704; 501/96.4
See application file for complete search history.

(56) References Cited

U.S. PATENT DOCUMENTS

5,328,875 A * 7/1994 Ueda ...................... B23B 27/148
51/307
6,316,094 B1 * 11/2001 Fukaya ............... C04B 35/5831
428/698
(Continued)

FOREIGN PATENT DOCUMENTS

JP 08-081270 * 3/1996
JP 2008-528413 A 7/2008
(Continued)

*Primary Examiner* — Archene A Turner
(74) *Attorney, Agent, or Firm* — Leason Ellis LLP

(57) ABSTRACT

Provided is a cBN sintered material for a tool body in which a ratio ($PN_{TB}/PN_{BN}$) of the number ($PN_{TB}$) of cBN particles in contact with a Ti boride having a long axis of 150 nm or more to the total number ($PN_{BN}$) of cBN particles is 0.05 or less.

4 Claims, 3 Drawing Sheets

(51) Int. Cl.
*C04B 35/626* (2006.01)
*C04B 35/64* (2006.01)
*C04B 35/645* (2006.01)

(56) References Cited

U.S. PATENT DOCUMENTS

| | | | | |
|---|---|---|---|---|
| 7,932,199 | B2* | 4/2011 | McHale, Jr. | B23B 27/148 |
| | | | | 51/309 |
| 8,007,552 | B2* | 8/2011 | Can | C04B 35/5831 |
| | | | | 51/307 |
| 2004/0002418 | A1* | 1/2004 | Scurlock | B23B 27/148 |
| | | | | 501/96.4 |

FOREIGN PATENT DOCUMENTS

| | | |
|---|---|---|
| JP | 2011-207689 A | 10/2011 |
| JP | 2014-083664 A | 5/2014 |
| JP | 5804448 B | 11/2015 |
| WO | WO-2006/046125 A | 5/2006 |

* cited by examiner

CBN SINTERED MATERIAL AND CUTTING TOOL

This application claims the benefit of Japanese Patent Application No. 2017-038471, filed Mar. 1, 2017, which is incorporated herein by reference in its entirety.

BACKGROUND OF THE INVENTION

Technical Field

The present invention relates to a cubic boron nitride—(hereinafter, referred to as "cBN") based ultra-high pressure sintered material (hereinafter, referred to as "cBN sintered material") having excellent toughness, and a cutting tool (hereinafter, referred to as "cBN tool") having a tool body formed of the same.

Background Art

Conventionally, cBN sintered materials are known to have excellent strength or toughness, and low affinity for iron based materials, and thus are used as cutting tool materials for iron-based workpieces such as steel, cast iron and the like by taking advantage of these characteristics.

For example, Japanese Unexamined Publication No. 2008-528413 discloses a cBN sintered material in which a green compact containing a Ti compound is sintered, crushed, cBN powder is added to a friction-milled slurry, and the slurry containing the cBN powder is crushed, mixed and dried to form a green compact, and a peak height in XRD after background correction for a peak of $TiB_2$ (101) contained in a matrix phase of a sintered material formed by sintering the green compact is smaller than 12% of a peak height of a (111) cBN peak, and thus fracture resistance and breakage resistance are improved.

Further, for example, Japanese Unexamined Publication No. 2011-207689 discloses a cBN composite sintered material which is a composite sintered material in which a raw material powder containing Ti compounds is crushed by controlling crushing conditions and then uniformly mixed with a cBN raw material powder to prepare a green compact and the green compact is sintered and which comprises 25 vol % to 80 vol % of cBN and a binding material containing a group of Ti compounds to obtain both fracture resistance and wear resistance. Here, the Ti group of compounds accounts for 10% to 60% of an area occupied by the binding material and contains a first fine particle component having a grain size of 0.1 μm or less and a second fine particle component having a grain size of more than 0.1 μm and 0.25 μm or less, and the first fine particle component and the second fine particle component account for 90% or more of an area occupied by the binding material.

Furthermore, for example, Japanese Patent No. 5804448 discloses a cBN sintered material with improved toughness in which cBN powder and hexagonal boron nitride powder (hereinafter, referred to as "hBN") in addition to a Ti compound as a binder phase raw material and the like are mixed, crushed and sintered to improve fracture resistance and wear resistance, such that there is no formation of massive $TiB_2$ phase in the binder phase and fine $TiB_2$ phase having an average grain size of 50 to 500 nm is dispersed to reduce formation of band-shaped/film-shaped $TiB_2$ phase on surfaces of cBN particles In addition, for example, Japanese Unexamined Publication No. 2014-83664 discloses a cBN sintered material with improved toughness in which cBN powder, hBN powder and a W compound powder in addition to a Ti compound as a binder phase raw material and the like are mixed, crushed and sintered to improve fracture resistance, such that there is no formation of massive $TiB_2$ phase and WB phase in the binder phase and a sintered structure in which the fine $TiB_2$ phase and the WB phase which are hard materials are dispersed and distributed is formed.

Technical Problem

In the cBN sintered material disclosed in Japanese Unexamined Publication No. 2008-528413, the fracture resistance and breakage resistance of the cBN sintered material are improved by dispersing the $TiB_2$ phase in the binder phase, but nothing is mentioned about a dispersed form of the $TiB_2$ phase in the binder phase.

For example, in the case in which a $TiB_2$ phase is formed in a band or film shape on an interface between the cBN particles and the binder phase and is formed as a large mass in the binder phase, when the cBN sintered material is used as a cutting tool, fracture/breakage may occur due to a decrease in toughness.

In the cBN sintered material disclosed in Japanese Unexamined Publication No. 2011-207689, since the inclusion of the W compound as the binding material is allowed, a W boride phase in addition to the Ti compound, for example, $TiB_2$ is formed at the time of sintering, the formation of the W boride phase minimizes the formation of $TiB_2$ on the interface of the binder phase with the cBN particles, thus an adhesive force of the interface of the binder phase with the cBN particles decreases, and this may serve as a crack initiation point and may reduce the fracture resistance.

In the cBN sintered material disclosed in Japanese Patent No. 5804448, although a technical idea of having the binder phase in which the fine $TiB_2$ is dispersed and distributed and avoiding the formation of film-shaped $TiB_2$ at the interface between the cBN particles and the binder phase to prevent deterioration of toughness is disclosed, it is impossible to completely avoid formation of thickened film-shaped $TiB_2$.

In the cBN sintered material disclosed in Japanese Unexamined Publication No. 2014-83664, the fine $TiB_2$ phase and WB phase are dispersed and distributed in the binder phase by adding the hBN and the W compound. However, since disclosure of means for reducing a residual amount of unreacted hBN and W compound to prevent reduction of the toughness is only to set the average grain size of the $TiB_2$ phase and the WB phase within a predetermined range, unreacted hBN and W compound may remain.

The present invention solves the problem that sufficient toughness may not be secured for the cBN sintered material in the above-described prior art, and an object thereof is to provide a cBN sintered material having high toughness and a cBN tool having a tool body formed of the same.

SUMMARY OF THE INVENTION

Solution to Problem

In order to solve the above-described problems, for a cBN sintered material and a cBN tool having a tool body formed of the same, the inventors of the present invention have focuses on controlling a dispersion/distribution form of the Ti boride contained in the binder phase; and the formation of the Ti boride in contact with the cBN particles, and have conducted extensive research thereon. As a result, the following new findings have been obtained.

Conventionally, in the production of a cBN sintered material, a raw material powder containing a Ti compound constituting a binder phase is crushed, then a cBN powder is added, and a green compact is prepared from the mixed and crushed powder and sintered to obtain a cBN sintered material.

However, the inventors have found that, in the case in which fine Ti oxide which is one example of a Ti compound is used for controlling a dispersion/distribution form of Ti boride contained in a binder phase, if only the fine Ti oxide is used, control becomes difficult due to aggregation, but the aggregation can be minimized by adding a fine Al compound, and it is also desirable to arrange the fine Ti oxide and the fine Al compound as close together as possible to control the dispersion and distribution form of the Ti boride contained in the binder phase.

Further, it has been found that it is desirable to use aluminum titanate (hereinafter referred to as "$Al_2O_5Ti$") to arrange the fine Ti oxide and the fine Al compound as close together as possible.

In addition, it has also been found that an average grain size of the cBN powder is preferably less than 100 nm and an average grain size of the $Al_2O_5Ti$ is preferably less than 50 nm.

That is, on the basis of these matters, for example, it has been found that it is possible to eliminate formation of $TiB_2$ as a large mass in the binder phase and formation of large band shapes or film shapes on an interface between the cBN particles and the binder phase.

The present invention has been made on the basis of the above findings and provides:

(1) A cBN sintered material for a tool body containing cBN particles and a binder phase, wherein the binder phase of the sintered material contains a Ti boride, an average grain size of the Ti boride is 10 nm to 200 nm, and a content thereof in the sintered material is 0.2 vol % to 10 vol %, and a ratio $PN_{TB}/PN_{BN}$ of the number $PN_{TB}$ of cBN particles in contact with the Ti boride having a long axis of 150 nm or more to the total number $PN_{BN}$ of cBN particles is 0.05 or less.

(2) The cBN particles may have an average grain size of 0.5 μm to 6.0 μm, and a content thereof may be 40 vol % to 78 vol %.

(3) A cutting tool having a tool body formed of the cBN sintered material according to the above embodiment.

Advantageous Effect of Invention

The cBN sintered material of the present invention has high toughness and exhibits excellent effects in which, as illustrated in FIG. 1, the fine Ti boride (1) is dispersed and distributed in the binder phase, and the formation of large band-shaped/film-shaped Ti borides in contact with the cBN particle surface is extremely reduced, and also unlike the techniques described in the prior patent documents, since substantially no W compounds are contained, a decrease in toughness is much less, and a service life time becomes longer when used as a tool, and further, since hBN powder is not used as a raw material, there is no possibility of unreacted hBN affecting the characteristics of the sintered material.

A cBN-based cutting tool using the cBN sintered material having excellent toughness of the present invention as a tool body has excellent fracture resistance even in, for example, high-speed cutting work of high hardness steel and exhibits excellent wear resistance over a long period of usage.

DETAILED DESCRIPTION OF THE INVENTION

Figure 1:
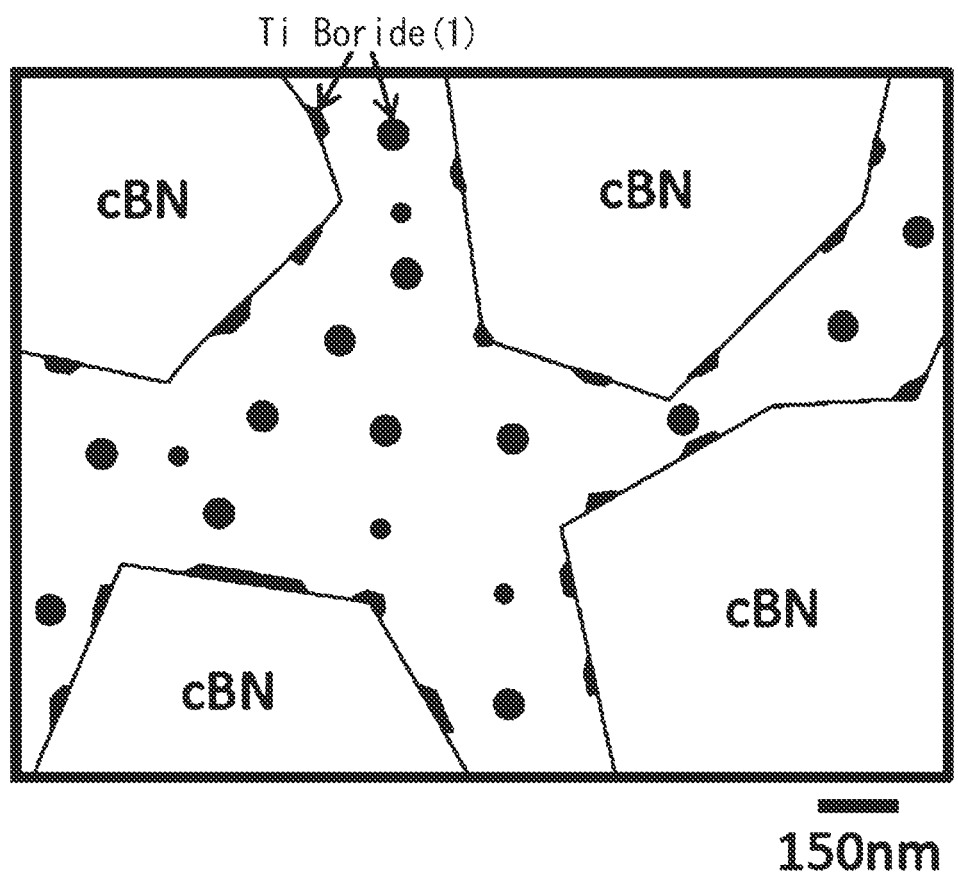
FIG. 1 is a schematic view illustrating a distribution of structures contained in a sintered structure of a cBN sintered material of the present invention, wherein a shape of each structure does not conform to an actual structure.

Hereinafter, the present invention will be described in detail.

cBN particles:

An average grain size of cBN particles used in the present invention is not particularly limited, but is preferably in a range of 0.5 μm to 6.0 μm.

This is because fracture and chipping starting from an irregular shape of a cutting edge caused by separation of the cBN particles from a tool surface during tool use are minimized by dispersing cBN particles having an average grain size of 0.5 μm to 6.0 μm in a sintered material, and propagation of cracks which develop from an interface between the cBN particles and a binder phase caused by a stress applied to the cutting edge during tool use or developing cracks caused by cracking of the cBN particles is also minimized by these cBN particles having a predetermined grain size dispersed in the sintered material, and thus excelling fracture resistance can be provided in addition to an effect of increasing the fracture resistance by including hard cBN particles in the sintered material.

Content ratio of cBN particles in cBN sintered material:

If a content ratio of the cBN particles in the cBN sintered material is less than 40 vol %, since an amount of hard substances is small in the sintered material, the fracture resistance is lowered when it is used as a tool. On the other hand, when it exceeds 78 vol %, gaps which serve as starting points of cracks are formed in the sintered material, and the fracture resistance is lowered. Therefore, the content ratio of cBN particles in the cBN sintered material is preferably in a range of 40 vol % to 78 vol % in order that the effects of the present invention are exhibited further.

Ti Boride:

Since a Ti boride dispersed and distributed in the binder phase of the cBN sintered material can be regarded as substantially $TiB_2$, the following description will be made on an assumption that the Ti boride is $TiB_2$. An average grain size of the $TiB_2$ is in a range of 10 nm to 200 nm. As described in a manufacturing method described later, since $TiB_2$ is formed by reaction of fine Ti oxide with fine cBN particles as a raw material powder for formation in the binder phase, it is preferable to micronize them by mixing and crushing to increase reactivity thereof. Since Ti oxide readily aggregates before $TiB_2$ is generated, fine Al compound is preferably added and also is more preferably arranged as close thereto as possible until a reaction forming $TiB_2$. Accordingly, as a supply source of the Ti oxide and the Al compound, for example, $Al_2O_5Ti$ powder having an average grain size of less than 50 nm is preferable. Further, the fine cBN particles in the present invention serve as a main supply source of elemental B necessary for generating $TiB_2$, and for cBN particles which serve as a hard phase in the cBN sintered material, coarse cBN particles are used as a separate raw material powder. As a fine cBN powder, for example, fine cBN powder having an average grain size of less than 100 nm is preferable.

When the average grain size of $TiB_2$ is less than 10 nm, a function of minimizing propagation of cracks generated in the sintered material during use of a tool is not sufficiently exhibited, and thus toughness may be lowered. On the other hand, when the average grain size of $TiB_2$ in the binder phase exceeds 200 nm, coarse $TiB_2$ is formed, which results in decrease in toughness and causes cracks, and thus the average grain size of $TiB_2$ dispersed and distributed in the binder phase of the cBN sintered material is 10 nm to 200 nm.

The grain sizes of the $Al_2O_5Ti$ powder as the supply source of elemental Ti and elemental Al and the cBN particles as the supply source of elemental B are desirable diameters in order to set in a range of the average grain size of the $TiB_2$.

Content of $TiB_2$ in the sintered material:

A content of $TiB_2$ dispersed and distributed in the cBN sintered material is preferably 0.2 vol % to 10 vol %. When it is less than 0.2 vol %, the function of minimizing the propagation of cracks generated in the sintered material when used as a tool cannot be obtained, and a service life of the tool is shortened. When it exceeds 10 vol %, a proportion of the binder phase accounted for by it increases, the binder phase becomes brittle, and toughness in a sintered material decreases. Accordingly, when it is used as a tool, the cBN sintered material tends to fracture, and a service life thereof becomes shorter.

Further, $TiB_2$ formed as described above is dispersed and distributed in the binder phase, and a ratio ($PN_{TB}/PN_{BN}$) of the number $PN_{TB}$ of cBN particles, in which $TiB_2$ particles with a long axis of 150 nm or more are in contact with surfaces of the cBN particles, to the number $PN_{BN}$ of cBN particles also has to be 0.05 or less.

This is because, when the ratio of cBN exceeds 0.05, much thickened $TiB_2$ formed in a band shape or a film shape on the surfaces of the cBN particles is present in $TiB_2$ dispersed and distributed in the binder phase, and during use of a tool, such coarsened $TiB_2$ itself formed in a band shape or a film shape serves as a starting point of fractures and thus the toughness of the sintered material may not be able to secured, and also since the fine $TiB_2$ is not dispersed and distributed in the binder phase, the function of minimizing the propagation of cracks generated in the sintered material when it is used as a tool may not be able to be obtained, and the toughness of the sintered material is lowered and the service life as a tool is shortened.

Method of manufacturing cBN sintered material:

An example of a procedure for manufacturing the cBN sintered material of the present invention having excellent toughness is described below.

(1) Preparation of Raw Material Powder Having Component Forming Binder Phase

Figure 2:
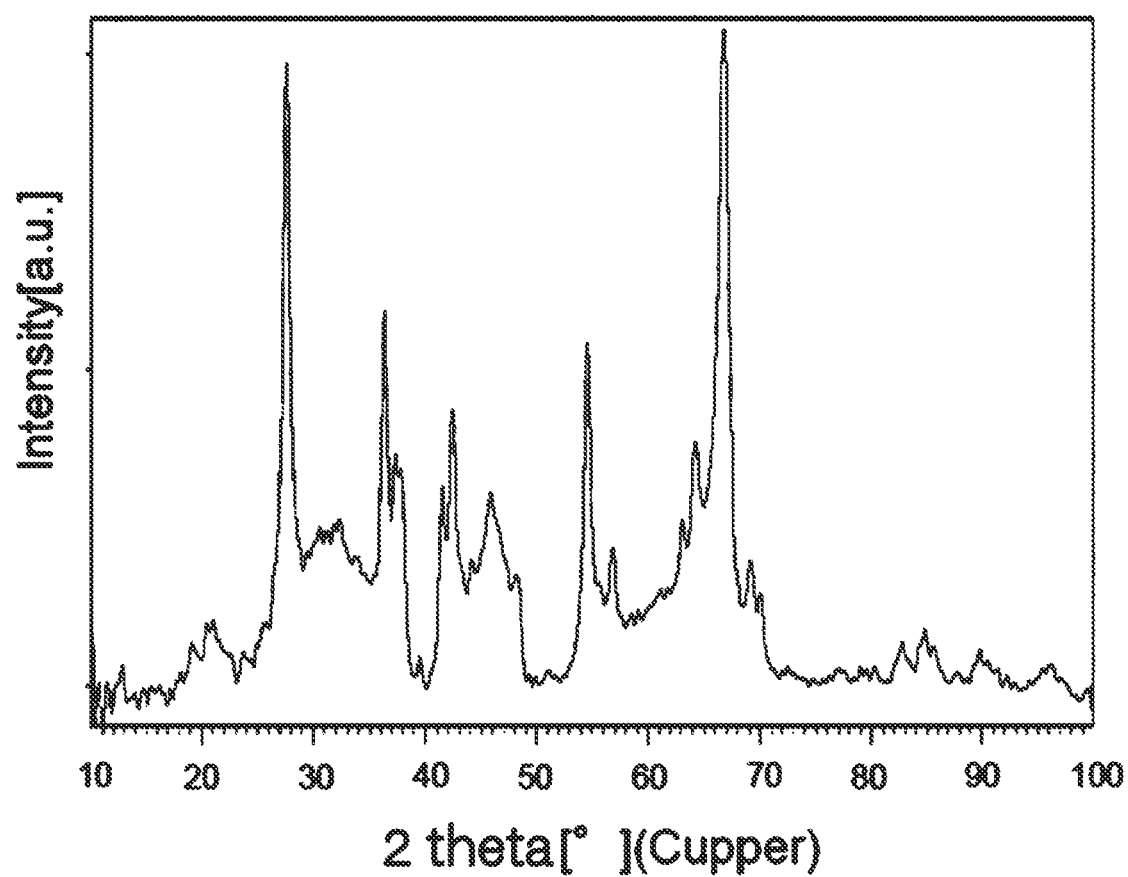
FIG. 2 is a view illustrating an example of X-ray diffraction (XRD) of $Al_2O_5Ti$ used in the present invention.

For a raw material powder forming the binder phase, a raw material for dispersion and distribution of $TiB_2$ in the binder phase and a main material for the binder phase are prepared. As a raw material for dispersion and distribution of $TiB_2$ in the binder phase, $Al_2O_5Ti$ powder having an average grain size of less than 50 nm and cBN particles having an average grain size of less than 100 nm are prepared. This $Al_2O_5Ti$ powder is commercially available, and for example, exhibits XRD as illustrated in FIG. 2. The $Al_2O_5Ti$ powder and the fine cBN powder are filled into a container lined with, for example, cemented carbide together with cemented carbide balls and acetone, covered with a lid and then crushed and mixed by a ball mill to obtain the raw material powder for formation and dispersion of the Ti boride in the uniformly mixed fine binder phase. Further, as a main raw material of the binder phase, conventionally known binder phase forming raw material powders (TiN powder, TiC powder, TiCN powder, Al powder, $Al_2O_3$ powder and the like) are prepared.

(2) Crushing and Mixing

These raw material powders are filled in a container lined with, for example, cemented carbide together with a cemented carbide ball and acetone, covered with a lid, and then crushed and mixed by a ball mill.

Then, cBN powder having an average grain size of 0.5 to 8.5 μm which is made to serve as a hard phase is added, and further mixing is carried out with the ball mill.

(3) Molding and Sintering

Next, the obtained raw material powder of the sintered material is molded at a predetermined pressure to prepare a green compact, and the green compact is preliminarily sintered at 900 to 1300° C. and then charged into an ultra-high pressure sintering apparatus and sintered at a pressure of 5 GPa and a predetermined temperature within a range of, for example 1200° C. to 1600° C., and thus a cBN sintered material of the present invention is produced.

CBN tool:

A cutting tool made of a cBN-based ultra-high pressure sintered material utilizing a cBN sintered material having excellent toughness for a tool body has excellent fracture resistance even in high-speed cutting work of, for example, high hardness steel and exhibits excellent wear resistance over a long period of usage.

Method of measuring each of numerical values:

A measurement method of each of numerical values specified in the present invention will be described.

Average grain size of $TiB_2$ contained in binder phase:

In order to measure the average grain size of $TiB_2$ contained in the binder phase, a mapping image of elemental Ti and elemental B is obtained using Auger electron spectroscopy (hereinafter, referred to as AES) for a cross-sectional structure of the cBN sintered material. In the obtained image, a portion in which elemental Ti and elemental B overlap is extracted by image processing, and the average grain size is calculated on the basis of a maximum length of each particle obtained by image analysis. For the image analysis, for example, the maximum length can be obtained by obtaining a Feret diameter of each particle. Further, a process of separating a portion in which the $TiB_2$ particles are considered to be in contact with each other may be performed, that is, the $TiB_2$ particles which are considered to be in contact with each other may be separated using, for example, watershed which is one of image processing operations.

In the calculation of the average grain size of $TiB_2$, first, the maximum length of each particle recognized as $TiB_2$ on the basis of the mapping image of the elemental Ti and the elemental B in one image is taken as a diameter of each particle. A cumulative volume according to a volume of each particle calculated from these diameters is calculated, a graph with a vertical axis as volume percent [%] and a horizontal axis as diameter [μm] is drawn on the basis of this cumulative volume, a diameter when the volume percentage is 50% is taken as the average grain size of $TiB_2$, this processing is carried out for 3 images, and an average value thereof is taken as the average grain size [μm] of $TiB_2$. When particle analysis is performed, a length (μm) per pixel is set using a scale value ascertained in advance using AES. A viewing area of about 5.0 μm×3.0 μm is preferable as an observation area used for image processing.

Content of $TiB_2$ in sintered material:

To obtain a content ratio of $TiB_2$ in the cBN sintered material, a mapping image of the elemental Ti and the elemental B is obtained by AES for a cross-sectional structure of the cBN sintered material. In the obtained image, a portion in which the elemental Ti and the elemental B overlap is extracted as $TiB_2$ by image processing, an area occupied by $TiB_2$ is calculated by the image analysis, and a ratio occupied by $TiB_2$ is obtained. This processing is carried out for at least 3 images, and an average value of the obtained values is taken as the content ratio of $TiB_2$. A viewing area of about 5.0 μm×3.0 μm is preferable as an observation area used for image processing.

Average grain size of cBN particles:

The average grain size of the cBN particles can be obtained as follows.

Figure 3:
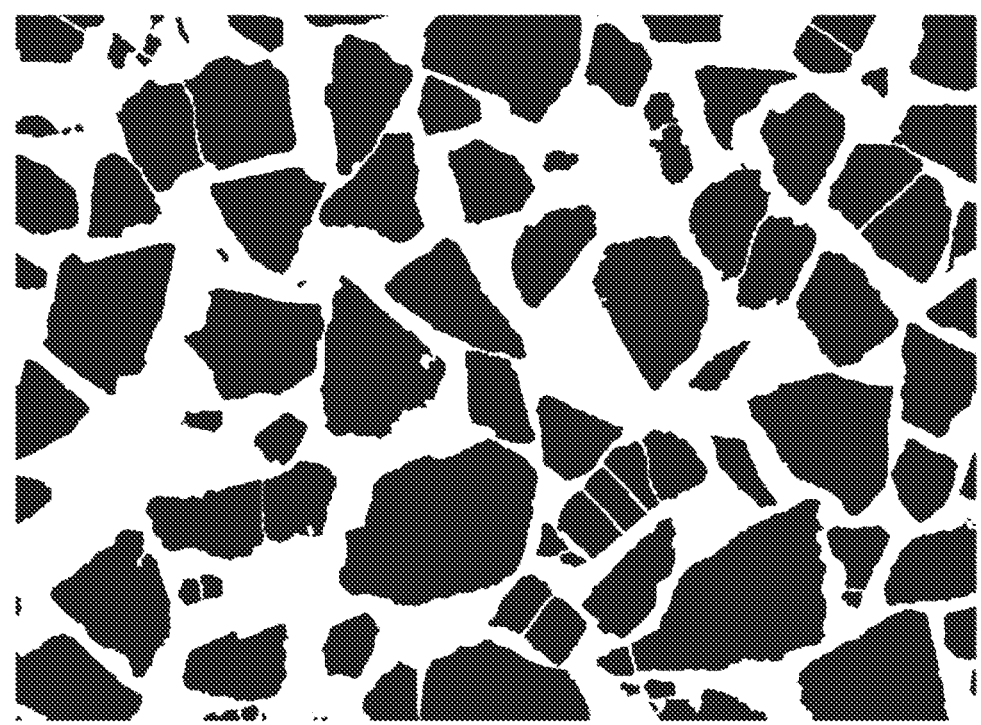
FIG. 3 is a view obtained by observing structures of the cBN sintered material with SEM and extracting a cBN particle portion by image processing.

A secondary electron image is obtained by observing the cBN sintered material structure in a cross-sectional structure of the cBN sintered material with SEM. A portion of the cBN particles in the obtained image is extracted by image processing (binarization) as illustrated in FIG. 3, and the average grain size is calculated on the basis of the maximum length of each particle obtained from the image analysis. When the portion of the cBN particles in the image is extracted by the image processing, the image is displayed in monochrome with 256 gradations from 0 for black to 255 for white, and binarization processing is performed to clearly determine the cBN particles and the binder phase, such that the cBN particles become black using an image having a pixel value in which a ratio of a pixel value of the cBN particle portion to a pixel value of the binder phase portion is 2 or more.

An average value is obtained within a region of about 0.5 μm×0.5 μm as an area for obtaining the pixel value of the cBN particle portion or the binder phase portion, and the average value obtained from at least three different places in the same image is preferably set as each contrast.

Further, after the binarization processing, the process of separating a portion in which the cBN particles are considered to be in contact with each other is performed, that is, the cBN particles which are considered to be in contact with each other are separated using, for example, watershed.

A portion (black portion) corresponding to the cBN particles in the image obtained after the binarization processing is particle-analyzed, and an obtained maximum length is taken as the maximum length of each particle, and it is taken as the diameter of each particle. As the particle analysis for obtaining the maximum length, for example, a value of a larger length of two lengths obtained by calculating the Feret diameter with respect to one cBN particle is taken as the maximum length, and the value is taken as the diameter of each particle. A cumulative volume up to a volume of each particle calculated from this diameter is calculated, a graph with a vertical axis as volume percent [%] and a horizontal axis as diameter [μm] is drawn on the basis of this cumulative volume, a diameter when the volume percentage is 50% is taken as the average grain size of the cBN particles, this processing is carried out for 3 images, and an average value thereof is taken as the average grain size [μm] of the cBN particles. When the particle analysis is performed, a length (μm) per pixel is set using a scale value ascertained in advance by SEM. When the average grain size of cBN particles is 3 μm, a viewing area of about 15.0 μm×15 μm is preferable as an observation area used for the image processing.

Content of cBN particles in sintered material:

To obtain a content ratio of the cBN particles accounting for the cBN sintered material, the cross-sectional structure of the cBN sintered material is observed by SEM, a portion of the cBN particles in the obtained secondary electron image is extracted by image processing, an area occupied by the cBN particles is calculated by image analysis, a ratio occupied by the cBN particles in one image is obtained, and an average value of values obtained by performing this processing for at least 3 images is taken as the content ratio of cBN particles. For example, when the average grain size of cBN particles is 3 μm, a viewing area of about 15 μm×15 μm is preferable as an observation area used for image processing.

Confirmation of presence of $TiB_2$ particles in contact with cBN particles and calculation of long axis:

In the case of the content ratio of the $TiB_2$ accounting for the cBN sintered materials, in the mapping image of the elemental Ti, the elemental B and elemental N obtained by AES for a cross-sectional structure of the cBN sintered material, a portion in which the elemental Ti and the elemental B overlap is identified as $TiB_2$, and a portion in which the elemental B and the elemental N overlap is specified as cBN, and $TiB_2$ in contact with the specified cBN portion is taken as $TiB_2$ in contact with a cBN particle. $TiB_2$ in contact with cBN particles is extracted by image processing, and a maximum length of each particle obtained by image analysis is taken as a long axis of $TiB_2$ in contact with a cBN particle.

When the portion of $TiB_2$ in contact with the cBN particles in the image is extracted by image processing, the image is displayed in monochrome with 256 gradations from 0 for black to 255 for white, and binarization processing is performed so that $TiB_2$ in contact with cBN particles becomes black.

Further, after the binarization processing, the process of separating a portion in which the $TiB_2$ particles in contact with the cBN particles are considered to be in contact with each other is performed, that is, the $TiB_2$ particles in contact with the cBN particles, which are considered to be in contact with each other, are separated using, for example, watershed.

A portion (black portion) corresponding to $TiB_2$ in contact with the cBN particles in the image obtained after the binarization processing is particle-analyzed, and an obtained maximum length is taken as the long axis of each particle. When the particle analysis is performed, a length (μm) per pixel is set using a scale value ascertained in advance by SEM.

Ratio $PN_{TB}/PN_{BN}$ of the number $PN_{TB}$ of cBN particles in contact with Ti boride having a long axis of 150 nm or more to the number $PN_{BN}$ of cBN particles contained in the cBN sintered material:

In an abundance ratio of cBN in contact with $TiB_2$ with a long axis of 150 nm or more, the total number $PN_{BN1}$ of the cBN particles in one image is obtained, the number $PN_{TB1}$ of cBN particles in contact with $TiB_2$ having a long axis of 150 nm or more among the $TiB_2$ particles in contact with the cBN particles as confirmed above is obtained, $PN_{TB1}/PN_{BN1}$ is obtained, and an average value of values obtained by performing this processing for at least 3 images is taken as the ratio $PN_{TB}/PN_{BN}$ of the number $PN_{TB}$ of cBN particles in contact with the Ti boride having a long axis of 150 nm or more to the number $PN_{BN}$ of cBN particles contained in the cBN sintered material.

Hereinafter, an embodiment of the present invention will be described.

EXAMPLES

In production of the cBN sintered material of the embodiment, $Al_2O_5Ti$ powder as a raw material for dispersion and distribution of $TiB_2$ in the binder phase and cBN powder were prepared as raw material powders for forming the binder phase, and a raw material powder for formation and dispersion of Ti boride in the binder phase in which each of these powders having a desired average grain size were mixed and crushed with a ball mill to control the grain size or the dispersion of $TiB_2$ in the cBN sintered material was prepared.

For example, $Al_2O_5Ti$ powder having an average grain size of 10 nm and cBN powder having an average grain size of 80 nm were prepared, filled in a container lined with cemented carbide together with a cemented carbide ball and acetone, covered with a lid and then crushed and mixed for 6 hours using a ball mill, and then the mixed slurry was dried to obtain the raw material powder for formation and dispersion of Ti boride in a fine binder phase in which the $Al_2O_5Ti$ powder and the cBN powder were uniformly mixed.

As described in Table 1, raw material powders for formation and dispersion of Ti boride in a fine binder phase with different particle sizes was prepared by changing a combination of the average grain size of the $Al_2O_5Ti$ powder and the cBN powder or a mixing time with the ball mill.

The raw material powders for formation and dispersion of the Ti boride in the binder phase as described above, and 0.3 μm to 0.9 μm TiN powder, TiC powder, TiCN powder, Al powder and $Al_2O_3$ powder were prepared and mixed together so that the content ratio of cBN particles after sintering was 36 to 80 vol % when a total amount of several raw material powders for forming the binder phase selected from these raw material powders, and coarse cBN powder having an average grain size of 0.5 μm to 8.5 μm as a cBN raw material for a hard phase was set to 100 vol %, and then wet mixing and drying were performed.

Then, the obtained sintered material raw material powder was press-molded into a size of 50 mm in diameter×1.5 mm in thickness at a molding pressure of 1 MPa, and the green compact was held and preliminarily sintered at a predetermined temperature within a range of 900 to 1300° C. in a vacuum atmosphere at a pressure of 1 Pa or less, then moved to an ultra-high pressure sintering apparatus and sintered at a predetermined temperature of 1400° C. and a pressure of 5 GPa, and thus cBN sintered materials 1 to 15 of the present invention (referred to as Examples 1 to 15 of the present invention) shown in Table 2 were prepared.

A main purpose of the heat treatment applied to the green compact was to remove a solvent at the time of wet mixing.

In the above-described manufacturing process, it is preferable to prevent oxidation of the raw material powders in the process up to the ultra-high pressure sintering, and specifically, it is preferable to handle them in a non-oxidizing protective atmosphere.

TABLE 1

| Classification | Average grain size of raw material powders for formation and dispersion of Ti boride in binder phase (nm) | | Crushing conditions Mixing time by ball mill (hour) |
|---|---|---|---|
| | $Al_2O_5Ti$ | cBN | |
| A | 10 | 80 | 6 |
| B | 10 | 80 | 48 |
| C | 25 | 80 | 6 |
| D | 50 | 100 | 3 |
| E | 50 | 100 | 12 |

TABLE 2

| Classification | | Classification of raw material powders for formation and dispersion of Ti boride | cBN Content (Calculated value) (vol %) | cBN Average grain size (μm) | $TiB_2$ content (vol %) | Average grain size of $TiB_2$ (nm) | Composition of binder phase (XRD peaks) | Value of $PN_{TB}/PN_{BN}$ (number ratio) |
|---|---|---|---|---|---|---|---|---|
| Sintered materials of the present invention | 1 | B | 54 | 1.1 | 5.2 | 10 | TiN, $TiB_2$, AlN, $Al_2O_3$, WC | 0 |
| | 2 | A | 53 | 0.9 | 4.7 | 27 | TiN, $TiB_2$, AlN, $Al_2O_3$ | 0 |
| | 3 | C | 55 | 1.1 | 5.1 | 49 | TiN, $TiB_2$, AlN, $Al_2O_3$ | 0.01 |
| | 4 | A + B | 80 | 0.5 | 0.8 | 21 | TiN, $TiB_2$, AN, $Al_2O_3$, WC | 0 |
| | 5 | A + C | 56 | 1.0 | 7.3 | 114 | TiN, $TiB_2$, AlN, $Al_2O_3$ | 0.02 |
| | 6 | E | 36 | 1.8 | 3.1 | 128 | TiN, $TiB_2$, AlN, $Al_2O_3$ | 0.02 |
| | 7 | A + E | 40 | 4.3 | 6.0 | 171 | TiN, $TiB_2$, AlN, $Al_2O_3$ | 0.02 |
| | 8 | D | 56 | 1.4 | 4.8 | 200 | TiN, $TiB_2$, AlN, $Al_2O_3$ | 0.05 |
| | 9 | B | 43 | 1.3 | 10.0 | 64 | TiN, $TiB_2$, AlN, $Al_2O_3$, WC | 0.01 |
| | 10 | B | 76 | 4.7 | 0.2 | 12 | TiN, $TiB_2$, AlN, $Al_2O_3$, WC | 0 |
| | 11 | B + C | 78 | 0.5 | 1.2 | 80 | TiN, TiC, $TiB_2$, AlN, $Al_2O_3$, WC | 0.01 |
| | 12 | A | 61 | 6.0 | 2.4 | 27 | TiN, $TiB_2$, AlN, $Al_2O_3$ | 0 |
| | 13 | A | 57 | 8.0 | 3.7 | 31 | TiCN, $TiB_2$, AlN, $Al_2O_3$ | 0 |
| | 14 | B | 62 | 0.3 | 3.3 | 11 | TiN, $TiB_2$, AlN, $Al_2O_3$, WC | 0 |
| | 15 | B | 57 | 2.6 | 7.9 | 78 | TiC, $TiB_2$, AlN, $Al_2O_3$, WC | 0.01 |

For comparison, the raw material powders for formation and dispersion of the Ti boride in the fine binder phase shown in Table 3 and TiN powder, TiC powder, TiC powder, Al powder and $Al_2O_3$ powder of 0.3 μm to 0.9 μm were prepared and mixed so that the content ratio of the cBN particles after sintering was 44 to 67 vol % when a total of several raw material powders for forming the binder phase selected from these raw material powders, and coarse cBN powder having an average grain size of 0.5 μm to 6.5 μm as cBN raw material was set to 100 vol %, and then were wet mixed and dried.

After that, a green compact was produced under the same conditions as the sintered materials 1 to 15 of the present invention and then subjected to heat treatment, and this green compact was sintered at an ultrahigh pressure and a high temperature under the same conditions as for the sintered materials 1 to 15 of the present invention, and thus cBN sintered materials 1 to 10 of Comparative Examples (hereinafter referred to as sintered materials of Comparative Examples) shown in Table 4 were prepared.

As is apparent from Table 4, the sintered material 1 of Comparative Example was a cBN sintered material which did not utilize the raw material powder for formation and dispersion of the Ti boride in the fine binder phase; and the sintered materials 2 and 3 of Comparative Examples were cBN sintered materials in which only one of the $Al_2O_5Ti$ powder and the cBN powder of the raw material powders for producing and dispersing the Ti boride in the binder phase was used. Thus the state of $TiB_2$ formation changed; and the ratio $PN_{TB}/PN_{BN}$ of the number $PN_{TB}$ of cBN particles in contact with the Ti boride having a long axis of 150 nm or more to the number $PN_{BN}$ of cBN particles contained in the cBN sintered material was outside of the scope of the present invention. The sintered materials 4 and 5 were cBN sintered materials in which the content of $TiB_2$ was outside of the scope of the present invention due to amounts of raw material powders used for formation and dispersion of the Ti boride in the binder phase. The sintered material 6 of Comparative Example was a cBN sintered material in which the grain size of $TiB_2$ in the binder phase was outside of the scope of the present invention due to crushing conditions of the raw material powder for formation and dispersion of the Ti boride in the binder phase. The sintered material 7 of Comparative Example was a cBN sintered material in which the cBN powder of the raw material powder for formation and dispersion of the Ti boride in the binder phase was set to hBN. Thus, the grain size of $TiB_2$ in the binder phase was outside of the scope of the present invention. The sintered materials 8 to 10 of Comparative Examples were cBN sintered materials in which two or more features of: the content of $TiB_2$; the grain size of $TiB_2$; and the ratio $PN_{TB}/PN_{BN}$ of the number $PN_{TB}$ of cBN particles in contact with the Ti boride having a long axis of 150 nm or more to the number $PN_{BN}$ of cBN particles contained in the cBN sintered material were outside of the scope of the present invention due to the used amount of the raw material powder for formation and dispersion of the Ti boride in the binder phase.

TABLE 3

| Classification | Average grain size of raw material powders for formation and dispersion of Ti boride in binder phase (nm) | | | Crushing conditions Mixing time by ball mill (hour) |
|---|---|---|---|---|
| | $Al_2O_5Ti$ | cBN | hBN | |
| a | — | 80 | — | — |
| b | 25 | — | — | — |
| c | 10 | 80 | — | 6 |
| d | 25 | 80 | — | 6 |
| e | 25 | 80 | — | 96 |
| f | 50 | — | 100 | 3 |

Next, Examples 1 to 15 of the present invention and the Comparative Examples 1 to 10 produced as described above were cut to predetermined dimensions with a wire electric discharge machine and were soldered to a soldering portion (corner portion) of an insert body formed of WC-based cemented carbide having a composition including 5 mass % of Co, 5 mass % of TaC and a remainder of WC and having an insert shape of the ISO standard CNGA 120408 using an Ag alloy soldering material having a composition including 26 mass % of Cu, 5 mass % of Ti and a remainder of Ag, and then polishing of upper and lower surfaces and an exterior thereof and a honing treatment were performed, and thus the cBN-based ultra-high pressure sintered material cutting tools (referred to as tools of Examples of the present invention) 1 to 15 having an insert shape of the ISO standard CNGA 120408 of the present invention and cBN-based ultra-high pressure sintered material cutting tools 1 to 10 of Comparative Examples (referred to as tools of Comparative Examples) were produced.

Next, the tools of Examples 1 to 15 of the present invention and the tools of Comparative Examples 1 to 10 were subjected to cutting work under the following cutting conditions, and a service life of the tool (number of times) until chipping occurred was measured.

<Cutting Conditions>

A dry cutting test of high hardness steel is carried out under the following conditions:

Workpiece: Round bar with 8 vertical grooves at regular intervals in a lengthwise direction of carburized hardened steel (JIS/SCM 415, hardness: HRC 58 to 62)

Cutting speed: 200 m/min

Cutting depth: 0.1 mm

Feeding: 0.1 mm/rev.

The number of separate instances of cutting before a cutting edge of each tool chipped or fractured was taken as the tool life, the cutting edge was observed after every 500 separate instances, and the presence or absence of chipping and fracture on the cutting edge was checked.

Table 5 shows the results of the above cutting test.

TABLE 4

| Classification | | Classification of raw material powders for formation and dispersion of Ti boride | cBN Content (Calculated value) (vol %) | cBN Average grain size (μm) | $TiB_2$ content (vol %) | Average grain size of $TiB_2$ (nm) | Composition of binder phase (XRD peaks) | Value of $PN_{TB}/PN_{BN}$ (number ratio) |
|---|---|---|---|---|---|---|---|---|
| Comparative sintered materials | 1 | Not use | 56 | 1.3 | 5.4 | 267 | TiN, $TiB_2$, AlN, $Al_2O_3$ | 0.53 |
| | 2 | a | 53 | 1.5 | 5.7 | 187 | TiN, $TiB_2$, AlN, $Al_2O_3$ | 0.47 |
| | 3 | b | 48 | 1.5 | 4.5 | 143 | TiN, $TiB_2$, AlN, $Al_2O_3$ | 0.26 |
| | 4 | c | 44 | 1.4 | 20.1 | 153 | TiN, $TiB_2$, AlN, $Al_2O_3$ | 0.05 |
| | 5 | d | 67 | 2.1 | 0.05 | 48 | TiN, $TiB_2$, AlN, $Al_2O_3$ | 0.02 |
| | 6 | e | 65 | 1.2 | 4.2 | 3 | TiN, $TiB_2$, AlN, $Al_2O_3$, WC | 0 |
| | 7 | f | 54 | 1.0 | 4.6 | 300 | TiN, $TiB_2$, AlN, $Al_2O_3$ | 0.05 |
| | 8 | c | 57 | 1.1 | 22.8 | 193 | TiC, $TiB_2$, AlN, $Al_2O_3$ | 0.37 |
| | 9 | d | 50 | 3.1 | 18.4 | 294 | TiN, $TiB_2$, AlN, $Al_2O_3$ | 0.44 |
| | 10 | e | 53 | 5.7 | 17.1 | 121 | TiN, $TiB_2$, AlN, $Al_2O_3$, WC | 0.32 |

TABLE 5

| Classification | Tool life (Intermittent number) | Classification | Tool life (Intermittent number) |
|---|---|---|---|
| Tool of Example 1 of the present invention | Chipping (after 15,500 times) | Tool of Comparative Example 1 | Fracture (after 2,000 times) |
| Tool of Example 2 of the present invention | Chipping (after 16,500 times) | Tool of Comparative Example 2 | Chipping (after 3,000 times) |
| Tool of Example 3 of the present invention | Chipping (after 18,000 times) | Tool of Comparative Example 3 | Fracture (after 3,000 times) |
| Tool of Example 4 of the present invention | Chipping (after 14,000 times) | Tool of Comparative Example 4 | Fracture (after 2,500 times) |
| Tool of Example 5 of the present invention | Chipping (after 16,000 times) | Tool of Comparative Example 5 | Fracture (after 2,500 times) |
| Tool of Example 6 of the present invention | Chipping (after 10,500 times) | Tool of Comparative Example 6 | Fracture (after 3,500 times) |
| Tool of Example 7 of the present invention | Chipping (after 12,000 times) | Tool of Comparative Example 7 | Chipping (after 3,000 times) |
| Tool of Example 8 of the present invention | Chipping (after 14,500 times) | Tool of Comparative Example 8 | Chipping (after 3,000 times) |
| Tool of Example 9 of the present invention | Chipping (after 15,000 times) | Tool of Comparative Example 9 | Chipping (after 2,500 times) |
| Tool of Example 10 of the present invention | Chipping (after 16,000 times) | Tool of Comparative Example 10 | Chipping (after 3,500 times) |
| Tool of Example 11 of the present invention | Chipping (after 15,000 times) | | |
| Tool of Example 12 of the present invention | Chipping (after 15,500 times) | | |
| Tool of Example 13 of the present invention | Chipping (after 12,000 times) | | |
| Tool of Example 14 of the present invention | Chipping (after 14,000 times) | | |
| Tool of Example 15 of the present invention | Chipping (after 15,500 times) | | |

From the results shown in Table 5, it was demonstrated that the toughness of the tool of the present invention was improved as compared with the tools of Comparative Examples, because the service life of the tool was prolonged without occurrence of unexpected chipping of the cutting edge.

INDUSTRIAL APPLICABILITY

When the cBN sintered material having excellent toughness of the present invention is used for a tool body of a cBN tool, it exhibits excellent fracture resistance over a long period of usage without the occurrence of chipping or breakage, and the tool life is prolonged, and thus it is possible to satisfactorily support improvement in performance of a cutting machine, labor saving and energy saving in a cutting process, and reduction in costs.

What is claimed is:

1. A cBN sintered material for a tool body comprising:
cBN particles; and
a binder phase, wherein
the binder phase of the sintered material contains a Ti boride, an average grain size of the Ti boride is 10 nm to 200 nm, and a content thereof in the sintered material is 0.2 vol % to 10 vol %, and
a ratio ($PN_{TB}/PN_{BN}$) of the number ($PN_{TB}$) of cBN particles in contact with the Ti boride having a long axis of 150 nm or more to the total number ($PN_{BN}$) of cBN particles is 0.05 or less.

2. The cBN sintered material according to claim 1, wherein the cBN particles have an average grain size of 0.5 μm to 6.0 μm, and a content thereof is 40 vol % to 78 vol %.

3. A cutting tool having a tool body formed of the cBN sintered material according to claim 1.

4. A cutting tool having a tool body formed of the cBN sintered material according to claim 2.

* * * * *